US011424647B2

(12) United States Patent
Van Wageningen et al.

(10) Patent No.: US 11,424,647 B2
(45) Date of Patent: *Aug. 23, 2022

(54) FOREIGN OBJECT DETECTION IN A WIRELESS POWER TRANSFER SYSTEM

(71) Applicant: KONINKLIJKE PHILIPS N.V., Eindhoven (NL)

(72) Inventors: Andries Van Wageningen, Wijlre (NL); Wilhelmus Gerardus Maria Ettes, Leeuwarden (NL); Eddy Gerrit Veltman, Steenbergen (NL); Antonius Adriaan Maria Staring, Eindhoven (NL); Richard Henricus Maria Theelen, Susteren (NL); Johannes Gerardus Fredericus Kablau, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/319,411

(22) Filed: May 13, 2021

(65) Prior Publication Data

US 2021/0265872 A1 Aug. 26, 2021

Related U.S. Application Data

(63) Continuation of application No. 16/615,570, filed as application No. PCT/EP2018/063745 on May 25, 2018, now Pat. No. 11,038,381.

(30) Foreign Application Priority Data

May 30, 2017 (EP) ...................................... 17173465

(51) Int. Cl.
*H02J 50/60* (2016.01)
*H02J 50/12* (2016.01)

(52) U.S. Cl.
CPC .............. *H02J 50/60* (2016.02); *H02J 50/12* (2016.02)

(58) Field of Classification Search
CPC .. H02J 50/60; H02J 50/12; H02J 50/80; H02J 7/025; H02J 50/402; G01V 3/10
See application file for complete search history.

(56) References Cited

U.S. PATENT DOCUMENTS 9,479,013 B2 10/2016 Joye et al.
9,625,501 B2 4/2017 Van Wageningen
(Continued)

OTHER PUBLICATIONS

Qi Specification (Wireless Power Consortium) Version 1.2.3. Feb. 2017.
(Continued)

*Primary Examiner* — Toan T Vu

(57) ABSTRACT

A power transmitter (101) for a wireless power transfer system comprises a transmitter coil (103) and a driver (201) generates a drive signal for the transmitter coil (103) employing a repeating time frame with a power transfer time interval and a foreign object detection time interval. A test generator (211) generates a test drive signal for a test coil (209) during the foreign object detection time interval. A foreign object detector (207) performs a foreign object detection test based on a measured parameter for the test drive signal. Prior to entering a power transfer phase, an adapter (213) controls the power transmitter (101) to operate in a foreign object detection initialization mode in which a preferred value of a signal parameter for the test drive signal is determined in response to at least a first message received from the power receiver (105). During the foreign object detection time interval the signal parameter of is set to the preferred value.

12 Claims, 6 Drawing Sheets

(56) References Cited

U.S. PATENT DOCUMENTS

| | | |
|---|---|---|
| 9,716,388 B2 | 7/2017 | Van Wageningen |
| 2009/0322281 A1 | 12/2009 | Kamijo et al. |
| 2016/0087690 A1 | 3/2016 | Tsukamoto |
| 2016/0126747 A1 | 5/2016 | Kato et al. |
| 2016/0149440 A1* | 5/2016 | Staring .................. H02J 50/12 307/104 |
| 2016/0149442 A1* | 5/2016 | Asanuma ................ G01V 3/10 307/104 |
| 2017/0117750 A1 | 4/2017 | Tsukamoto |
| 2017/0141604 A1 | 5/2017 | Park et al. |
| 2018/0026482 A1* | 1/2018 | Asano ...................... H02J 7/00 307/104 |

OTHER PUBLICATIONS

International Search Report and Written Opinion FRM PCT/EP2018/063745 dated Jun. 18, 2019.

* cited by examiner

FOREIGN OBJECT DETECTION IN A WIRELESS POWER TRANSFER SYSTEM

CROSS-REFERENCE TO RELATED APPLICATIONS

This application a continuation of U.S. application Ser. No. 16/615,570 filed on Nov. 21, 2019, which claims the benefit of International Application No. PCT/EP2018/063745 filed May 25, 2018 which claims the benefit of EP Application No. 17173465.0, filed May 30, 2017. These applications are hereby incorporated by reference herein.

FIELD OF THE INVENTION

The invention relates to foreign object detection in a wireless power transfer system and in particular, but not exclusively, to foreign object detection for a power transmitter providing inductive power transfer to higher power devices, such as e.g. kitchen appliances.

BACKGROUND OF THE INVENTION

Most present-day electrical products require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter inductor in a power transmitter device to a receiver coil in the individual devices.

Power transmission via magnetic induction is a well-known concept, mostly applied in transformers having a tight coupling between a primary transmitter inductor/coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach, known as the Qi Specifications, has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index-.html, where in particular the defined Specification documents can be found.

A potential problem with wireless power transfer is that power may unintentionally be transferred to e.g. metallic objects that happen to be in the vicinity of the power transmitter. For example, if a foreign object, such as e.g. a coin, key, ring etc., is placed upon the power transmitter platform arranged to receive a power receiver, the magnetic flux generated by the transmitter coil will introduce eddy currents in the metal objects which will cause the objects to heat up. The heat increase may be very significant and may be highly disadvantageous.

In order to reduce the risk of such scenarios arising, it has been proposed to introduce foreign object detection where the power transmitter can detect the presence of a foreign object and reduce the transmit power and/or generate a user alert when a positive detection occurs. For example, the Qi system includes functionality for detecting a foreign object, and for reducing power if a foreign object is detected. Specifically, Qi specification version 1.2.1, section 11 describes various methods of detecting a foreign object.

One method to detect such foreign objects is disclosed in WO2015018868A1. Another example is provided in WO 2012127335 which discloses an approach based on determining unknown power losses. In the approach, both the power receiver and the power transmitter measure their power, and the receiver communicates its measured received power to the power transmitter. When the power transmitter detects a significant difference between the power sent by the transmitter and the power received by the receiver, an unwanted foreign object may potentially be present, and the power transfer may be reduced or aborted for safety reasons. This power loss method requires synchronized accurate power measurements performed by the power transmitter and the power receiver.

For example, in the Qi power transfer standard, the power receiver estimates its received power e.g. by measuring the rectified voltage and current, multiplying them and adding an estimate of the internal power losses in the power receiver (e.g. losses of the rectifier, the receiver coil, metal parts being part of the receiver etc.). The power receiver reports the determined received power to the power transmitter with a minimum rate of e.g. every four seconds.

The power transmitter estimates its transmitted power, e.g. by measuring the DC input voltage and current of the inverter, multiplying them and correcting the result by subtracting an estimation of the internal power losses in the transmitter, such as e.g. the estimated power loss in the inverter, the primary coil, and metal parts that are part of the power transmitter.

The power transmitter can estimate the power loss by subtracting the reported received power from the transmitted power. If the difference exceeds a threshold, the transmitter will assume that too much power is dissipated in a foreign object, and it can then proceed to terminate the power transfer.

Alternatively, it has been proposed to measure the quality or Q-factor of the resonant circuit formed by the primary and secondary coils together with the corresponding capacitances and resistances. A reduction in the measured Q-factor may be indicative of a foreign object being present.

In practice, it tends to be difficult to achieve sufficient detection accuracy using the methods described in the Qi specification. This difficulty is exacerbated by a number of uncertainties about the specific current operating conditions.

For example, a particular problem is the potential presence of friendly metals (i.e. metal parts of the device that embodies the power receiver or the power transmitter) as the magnetic and electrical properties of these may be unknown (and vary between different devices) and therefore may be difficult to compensate for.

Further, undesirable heating may result from even relatively small amounts of power being dissipated in a metallic foreign object. Therefore, it is necessary to detect even a small power discrepancy between the transmitted and received power, and this may be particularly difficult when the power levels of the power transfer increase.

The Q factor degradation approach may in many scenarios have a better sensitivity for detecting the presence of metal objects. However, it may still not provide sufficient accuracy and e.g. may also suffer from the influence of friendly metal.

The performance of the foreign object detection is subject to the specific operating conditions that are present when the test is actually performed. For example, if, as described in the Qi specification, a measurement for foreign object detection is performed in the Selection Phase of a power transfer initialization process, the signal that the power transmitter provides for the measurement must be small enough to prevent that it wakes up the power receiver. However, for such a small signal, the signal/noise ratio is typically poor, resulting in reduced accuracy of the measurement.

The requirement for a small measurement signal may result in other disadvantageous effects. A power receiver exposed to a small measurement signal may exhibit a leakage current that depends on the level of the measurement signal, the coupling between the primary and secondary coil, and the charging state of a capacitor at the output of the rectifier. This leakage current can therefore be different depending on the actual conditions. Since leakage current influences the reflected impedance at the power transmitter coil, the measurement of the quality factor will also depend on the specific current conditions.

Another issue is that foreign object detection is typically a very sensitive test where it is desired that relatively small changes caused by the presence of a foreign object is detected in an environment with possibly a large variation of the operating conditions and scenarios for which the test is being performed.

Accordingly, current algorithms tend to be suboptimal and may in some scenarios and examples provide less than optimum performance. In particular, they may result in the presence of foreign objects not being detected, or in false detections of foreign objects when none are present.

Hence, an improved object detection would be advantageous and, in particular, an approach allowing increased flexibility, reduced cost, reduced complexity, improved object detection, fewer false detections and missed detections, backwards compatibility, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided power transmitter for wirelessly providing power to a power receiver via an inductive power transfer signal; the power transmitter comprising: a transmitter coil for generating the power transfer signal; a driver for generating a drive signal for the transmitter coil, the driver being arranged to, during a power transfer phase, generate the drive signal to employ a repeating time frame comprising at least a power transfer time interval and a foreign object detection time interval; a receiver for receiving messages from the power receiver; a test coil for generating an electromagnetic test signal; a test generator arranged to generate a test drive signal for the test coil to provide the electromagnetic test signal during the foreign object detection time interval; a foreign object detector arranged to perform a foreign object detection test in response to a measured parameter for the test drive signal; an adapter for, prior to entering the power transfer phase, control the power transmitter to operate in a foreign object detection initialization mode in which a preferred value of a signal parameter for the test drive signal is determined in response to at least a first message received from the power receiver; and wherein the test generator is arranged to set the signal parameter of the test drive signal to the preferred value during the foreign object detection time interval.

The invention may provide improved foreign object detection in many embodiments. In many scenarios and systems, a more accurate foreign object detection may be achieved. The approach may in many embodiments reduce complexity and may in many systems provide a high degree of backwards compatibility. Specifically, the approach may be particularly suitable for improving foreign object detection in Qi wireless power transfer systems e.g. operating in accordance with version 1.2 or earlier of the Qi Specifications.

The approach may allow for improved accuracy and/or reliability of foreign object detection tests during the power transfer phase. In many embodiments, the approach may reduce uncertainty and variation for the foreign object detection tests thereby improving performance. The approach mays specifically reduce the impact on power transfer variations and operating conditions on the foreign object detection. The approach may for example bias the system towards working at a specific, e.g. predetermined, reference scenario and operating point during the foreign object detection. This may improve consistency and predictability for the foreign object detection test. In particular, it may allow a more accurate and more reliable estimation of the impact of the power receiver on the electromagnetic test signal, and thus may allow the foreign object detector to improve compensation therefor.

In many embodiments, the test coil and the transmitter coil may be the same coil. In many embodiments, the driver and the test generator may be the same entity, thus the same circuitry may generate both the drive signal and the test drive signal. In many embodiments, the power transfer signal and the test drive signal may share many parameter values, for example they may have the same frequency.

The signal parameter for which a preferred value is determined may specifically be a frequency, voltage, current, signal level, phase, timing, and/or amplitude.

The preferred value may be any value that is determined by the adapter for the signal parameter, and may equivalently be referred to as e.g. the first parameter.

In many embodiments, a duration of the foreign object detection time interval is no more than 5%, 10%, or 20% of the duration of the time frame. In many embodiments, the duration of the foreign object detection time interval(s) is no less than 70%, 80%, or 90% of the time frame. The adapter may control the power transmitter to operate in the foreign object detection initialization mode in an adaptation time interval. In many embodiments, the duration of the foreign object detection time interval is no more than 5%, 10%, or 20% of the duration of the adaptation time interval.

The approach may e.g. introduce a foreign object detection time interval in which the power receiver can operate with both a high induced voltage yet light load, corresponding to a high magnetic field strength yet low loading of the electromagnetic signal.

In such scenarios, the impact of a foreign object may be more noticeable as power induced in such an object will represent a higher proportion of the total power extracted. Indeed, the higher magnetic strength may result in a higher induced signal in any foreign object being present, and the reduced loading may reduce the impact of the presence of the power receiver when detecting whether a foreign object is present.

The foreign object detector may be arranged to determine that a foreign object is detected if a difference between the power level of the electromagnetic test signal and the power indicated by a loading indication received from the power receiver and indicating an expected load of the electromagnetic test signal is above a threshold. If the difference is below the threshold, the foreign object detector may determine that no foreign object is detected.

The foreign object detector may be arranged to determine that a foreign object is detected if a quality measure (determined from measurements of the drive signal) for a resonance circuit comprising the test coil is below a threshold. The threshold may typically be dependent on a message received from the power receiver.

In accordance with an optional feature of the invention, the first message comprises an indication of a property of the power receiver.

This may provide improved foreign object detection, and in particular may provide improved reliability and accuracy of the foreign object detection test. It may in particular allow the foreign object detection test to provide improved compensation for the specific properties of the power receiver when determining the preferred value. It may also allow the foreign object detection test to compensate for properties of the individual power receiver.

The property may for example be an indication of a type/class/category of power receiver and/or may be a power receiver identification. In some embodiments, the indication of the property may be indicative of an estimated loading of the electromagnetic test signal by the power receiver, such as e.g. an indication of the loading by friendly metal of the power receiver. In some embodiments, the indication of the property may be an indication of a preferred parameter setting, such as e.g. an indication of a resonance frequency of a resonance circuit of the power receiver including a power receiving coil.

In some embodiments, the indication of the property may be indicative of an estimated loading of the electromagnetic test signal by the power receiver, such as e.g. an indication of the loading by friendly metal of the power receiver.

In some embodiments, the indication of the property may be indicative of an estimated loading of the electromagnetic test signal by the power receiver, such as e.g. an indication of the loading by friendly metal of the power receiver. In some embodiments, the indication of the property may be indicative of an estimated impact on a quality measure for a resonance circuit comprising the transmitter coil, such as e.g. an indication of the impact of friendly metal of the power receiver.

In accordance with an optional feature of the invention, the first message comprises an indication of an expected impact of the power receiver on a reference electromagnetic test signal.

This may provide improved foreign object detection, and in particular may provide improved reliability and accuracy of the foreign object detection test. It may in particular allow the foreign object detection test to provide improved compensation for the impact of the power receiver when determining the preferred value. It may also allow the foreign object detection test to compensate for the impact of the individual power receiver.

In some embodiments, the indication of the property may be indicative of an estimated loading of the electromagnetic test signal by the power receiver, such as e.g. an indication of the loading by friendly metal of the power receiver.

In some embodiments, the indication of the property may be indicative of an estimated loading of the electromagnetic test signal by the power receiver, such as e.g. an indication of the loading by friendly metal of the power receiver. In some embodiments, the indication of the property may be indicative of an estimated impact on a quality measure for a resonance circuit comprising the transmitter coil, such as e.g. an indication of the impact of friendly metal of the power receiver.

The indication of the expected impact may for example be an indication of an expected power dissipation of the power receiver during the foreign object detection time interval, or an indication of an expected impact on a quality measure for a resonance circuit comprising the test coil.

In accordance with an optional feature of the invention, the first message comprises an indication of a constraint for the signal parameter for the test drive signal.

This may provide improved foreign object detection, and in particular may provide improved reliability and accuracy of the foreign object detection test. It may in particular allow the test drive signal and thus the electromagnetic test signal to be generated to have properties that allow improved foreign object detection and/or may ensure acceptable operation (e.g. sufficient power during foreign object detection).

The constraint may specifically be a constraint on a signal level (current, voltage and/or power) or frequency (e.g. maximum and/or minimum) of the test drive signal.

In accordance with an optional feature of the invention, the first message comprises an indication of a difference between a current power receiver operating value and a test reference power receiver operating value.

This may provide improved foreign object detection, and in particular may provide improved reliability and accuracy of the foreign object detection test. It may in particular allow the power transmitter to generate the test drive signal to result in properties of the electromagnetic test signal corresponding to a desired reference level (or interval).

In accordance with an optional feature of the invention, the adapter is further arranged to determine the preferred value in response to constraint of the foreign object detection test of the foreign object detector.

This may provide improved foreign object detection, and in particular may provide improved reliability and accuracy of the foreign object detection test. In particular, it may ensure that the foreign object detection is performed with a suitable electromagnetic test signal for the test even if the power receiver requests or indicates that other values should be used.

In accordance with an optional feature of the invention, the constraint is at least one of a minimum signal level and a constraint on a frequency of the test drive signal.

This may provide improved foreign object detection, and in particular may provide improved reliability and accuracy of the foreign object detection test.

In accordance with an optional feature of the invention, the test generator is arranged to generate the test drive signal with the drive parameter of the test drive signal adapted to the preferred value in an initial test interval prior to the power transfer phase; and the foreign object detector is arranged to perform the foreign object detection test in the initial test interval.

This may provide improved operation and may specifically typically avoid initialization of the power transfer phase with a foreign object present. It may also increase reliability and reduce the risk of the signal parameter being set to a value that is not suitable for foreign object detection.

In accordance with an optional feature of the invention, if the foreign object detection test in the foreign object detection time interval is indicative of a foreign object being present, the foreign object detector is arranged to re-enter the power transmitter into the foreign object detection initialization mode.

This may provide improved operation in many scenarios. For example, it may in many embodiments allow the system to automatically re-calibrate to sudden changes in the operating conditions, such as e.g. caused by a movement of the power receiver relatively to the power transmitter.

In accordance with an optional feature of the invention, the adapter is arranged to prevent the power transmitter from entering the power transfer phase if the preferred value does not meet a criterion.

This may provide improved operation and may specifically typically avoid initialization of the power transfer phase with a foreign object present. It may also increase reliability and reduce the risk of the signal parameter being set to a value that is not suitable for foreign object detection (or potentially any other operation).

In accordance with an optional feature of the invention, the foreign object detector is arranged to adapt a parameter of the foreign object detection test in response to a measured value of the drive signal when in the foreign object detection initialization mode.

This may provide improved foreign object detection, and in particular may provide improved reliability and accuracy of the foreign object detection test.

In accordance with an optional feature of the invention, the adapter is arranged to set a maximum level for the power transfer signal during the power transfer interval in response to a measurement of the test drive signal during the foreign object detection interval.

This may provide improved operation in many embodiments.

According to an aspect of the invention there is provided a wireless power transfer system comprising a power transmitter for wirelessly providing power to a power receiver via an inductive power transfer signal; the power transmitter comprising: a transmitter coil for generating the power transfer signal; a driver for generating a drive signal for the transmitter coil, the driver being arranged to, during a power transfer phase, generate the drive signal to employ a repeating time frame comprising at least a power transfer time interval and a foreign object detection time interval, a power of the power transfer signal being reduced during the foreign object detection time interval relative to the power transfer time interval; a receiver for receiving messages from the power receiver; a test coil for generating an electromagnetic test signal; a test generator arranged to generate a test drive signal for the test coil to provide the electromagnetic test signal during the foreign object detection time interval; a foreign object detector arranged to perform a foreign object detection test in response to a measured parameter for the test drive signal; an adapter for, prior to entering the power transfer phase, control the power transmitter to operate in a foreign object detection initialization mode in which a preferred value of a signal parameter for the test drive signal is determined in response to at least a first message received from the power receiver; and wherein the test generator is arranged to set the signal parameter of the test drive signal to the preferred value during the foreign object detection time interval; and the power receiver comprising: a power receiving coil for extracting power from the power transfer signal; a foreign object detection controller for reducing a load of the power receiver during the foreign object detection time interval; a message transmitter for transmitting the first message to the power transmitter.

In accordance with an optional feature of the invention, the power receiver further comprises a power receiver controller arranged to control the power receiver to operate in a foreign object detection initialization mode in which the power receiver transmits at least one message to the power transmitter to bias the test drive signal towards causing a reference condition at the power receiver.

This may provide improved foreign object detection, and in particular may provide improved reliability and accuracy of the foreign object detection test.

In many embodiments, the adapter may be arranged to determine the preferred value of the signal parameter in response to a measurement of the test drive signal for the power receiver being at the reference condition.

According to an aspect of the invention there is provided a method of operation for a power transmitter wirelessly providing power to a power receiver via an inductive power transfer signal; the power transmitter comprising: a transmitter coil for generating the power transfer signal, a test coil for generating an electromagnetic test signal, and a receiver for receiving messages from the power receiver; and the method comprising: generating a drive signal for the transmitter coil, the drive signal, during a power transfer phase, employing a repeating time frame comprising at least a power transfer time interval and a foreign object detection time interval; generating a test drive signal for the test coil to provide the electromagnetic test signal during the foreign object detection time interval; performing a foreign object detection test in response to a measured parameter for the test drive signal; and prior to entering the power transfer phase, controlling the power transmitter to operate in a foreign object detection initialization mode in which a preferred value of a signal parameter for the test drive signal is determined in response to at least a first message received from the power receiver; and wherein the test drive signal is generated with the signal parameter set to the preferred value during the foreign object detection time interval These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

The following description focuses on embodiments of the invention applicable to a wireless power transfer system utilizing a power transfer approach such as known from the Qi specification. However, it will be appreciated that the invention is not limited to this application but may be applied to many other wireless power transfer systems.

Figure 1:
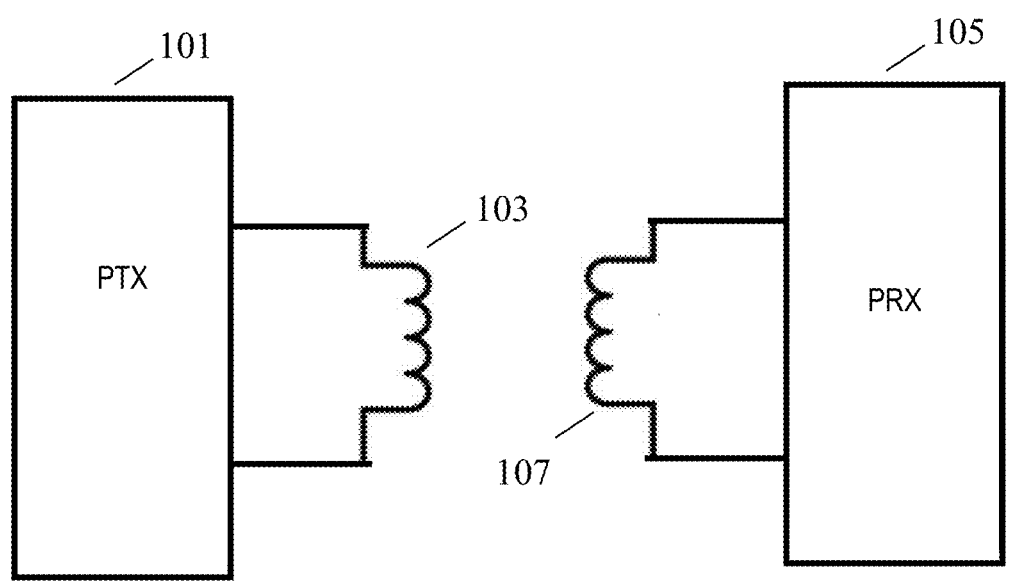
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides an electromagnetic power transfer signal which may inductively transfer power from the power transmitter 101 to the power receiver 105. Specifically, the power transmitter 101 generates an electromagnetic signal, which is propagated as a magnetic flux by the transmitter coil or inductor 103. The power transfer signal may typically have a frequency between around 20 kHz to around 500 kHz, and often for Qi compatible systems typically in the range from 95 kHz to 205 kHz (or e.g. for high power kitchen applications, the frequency may e.g. typically be in the range between 20 kHz to 80 kHz). The transmitter coil 103 and the power receiving coil 107 are loosely coupled and thus the power receiving coil 107 picks up (at least part of) the power transfer signal from the power transmitter 101. Thus, the power is transferred from the power transmitter 101 to the power receiver 105 via a wireless inductive coupling from the transmitter coil 103 to the power receiving coil 107. The term power transfer signal is mainly used to refer to the inductive signal/magnetic field between the transmitter coil 103 and the power receiving coil 107 (the magnetic flux signal), but it will be appreciated that by equivalence it may also be considered and used as a reference to an electrical signal provided to the transmitter coil 103 or picked up by the power receiving coil 107.

In the example, the power receiver 105 is specifically a power receiver that receives power via the receiver coil 107. However, in other embodiments, the power receiver 105 may comprise a metallic element, such as a metallic heating element, in which case the power transfer signal directly induces eddy currents resulting in a direct heating of the element.

The system is arranged to transfer substantial power levels, and specifically the power transmitter may support power levels in excess of 500 mW, 1 W, 5 W, 50 W, 100 W or 500 W in many embodiments. For example, for Qi corresponding applications, the power transfers may typically be in the 1-5 W power range for low power applications (the basic power profile), up to 15 W for Qi specification version 1.2, in the range up to 100 W for higher power applications such as power tools, laptops, drones, robots etc., and in excess of 100 W and up to more than 1000 W for very high power applications, such as e.g. kitchen applications.

In the following, the operation of the power transmitter 101 and the power receiver 105 will be described with specific reference to an embodiment generally in accordance with the Qi Specification (except for the herein described (or consequential) modifications and enhancements) or suitable for the higher power kitchen specification being developed by the Wireless Power Consortium. In particular, the power transmitter 101 and the power receiver 105 may follow, or substantially be compatible with, elements of the Qi Specification version 1.0, 1.1 or 1.2 (except for the herein described (or consequential) modifications and enhancements).

In wireless power transfer systems, the presence of an object (typically a conductive element extracting power from the power transfer signal and not being part of the power transmitter 101 or the power receiver 105, i.e. being an unintended, undesired, and/or interfering element to the power transfer) may be highly disadvantageous during a power transfer. Such an undesired object is in the field known as a foreign object.

A foreign object may not only reduce efficiency by adding a power loss to the operation but may also degrade the power transfer operation itself (e.g. by interfering with the power transfer efficiency or extracting power not directly controlled e.g. by the power transfer loop). In addition, the induction of currents in the foreign object (specifically eddy currents in the metal part of a foreign object) may result in an often highly undesirable heating of the foreign object.

In order to address such scenarios, wireless power transfer systems such as Qi include functionality for foreign object detection. Specifically, the power transmitter comprises functionality seeking to detect whether a foreign object is present. If so, the power transmitter may e.g. terminate the power transfer or reduce the maximum amount of power that can be transferred.

Current approaches proposed by the Qi Specifications are based on detecting a power loss (by comparing the transmitted and the reported received power) or detecting degradations in the quality Q of the output resonance circuit. However, in current use these approaches have been found to provide suboptimal performance in many scenarios, and they may specifically lead to inaccurate detection resulting in missed detections and/or false positives where a foreign object is detected despite no such object being present.

Foreign object detection may be performed before a power receiver enters the power transfer phase (e.g. during the initialization of the power transfer) or during the power transfer phase. Detection during the power transfer phase is often based on comparisons of measured transmitted power and received power whereas detection that take place before the power transfer phase is often based on measurements of a reflected impedance, e.g. by measuring the quality factor of the transmitter coil by using a small measurement signal.

The inventors have realized that conventional foreign object detection operates suboptimally and that this is partly due to variations and uncertainties in the specific operating conditions and scenario in which the foreign object detection is performed, including variations and uncertainties in the power transmitter properties, power receiver properties, test conditions applied etc.

An example of the challenges to foreign object detection tests is the requirement to perform sufficiently accurate measurements in order to achieve a sufficiently reliable foreign object detection. For example, if a measurement for a foreign object detection takes place in the selection phase of a Qi power transfer initialization phase, the signal that the power transmitter provides for this measurement has to be small enough not to wake up the power receiver. However, this typically result in poor signal/noise ratios leading to reduced detection accuracy. Therefore, the detection performance may be sensitive to the specific signal level applied and there will typically be conflicting requirements.

A power receiver exposed to a small electromagnetic signal may show a leakage current that depends on the level of the electromagnetic signal, the coupling between the primary and secondary coil, and the charging state of the capacitor at the output of the rectifier. This leakage current can therefore vary depending on the actual conditions currently experienced and depending on the specific parameters (e.g. properties of capacitor) of the individual power receiver. Since leakage current influences the reflected impedance at the primary coil, the measurement of the quality factor also depends on the actual conditions and this typically prevents optimal detection.

Yet another problem detecting a foreign object based on e.g. reported received power indications at different loads or signal levels can be less reliable than desired due to the relationships between transmitted and received power being different for different loads and signals levels.

The system of FIG. 1 uses an approach for foreign object detection that seeks to reduce uncertainty and sensitivity to variations, and accordingly it seeks to provide improved foreign object detection. The approach may in many embodiments provide improved foreign object detection and specifically may in many embodiments provide a more accurate and/or reliable foreign object detection. The approach may further allow low complexity and low resource requirements. An advantage of the approach is that it may be suitable for inclusion in many existing systems, such as specifically in a Qi wireless power transfer system, and indeed that this may often be achieved with few modifications.

As will be described in more detail in the following, the approach utilizes a time division approach during the power transfer phase wherein foreign object detection and power transfer may e.g. be performed in separate time intervals thereby allowing the interference between these (specifically the impact of the power transfer on the foreign object detection) to be reduced substantially. Furthermore, parameters of the generated electromagnetic signal may be adapted to the specific test scenario, including parameters of potentially both the power transmitter and the power receiver. This can be achieved through an adaptation process which is performed prior to the system entering the power transfer phase wherein one or more preferred parameter values of the test signal are determined based on at least one message received from the power receiver.

The approach may substantially reduce variations and uncertainties and lead to typically a much more accurate foreign objection detection.

For example, the influence and corresponding uncertainty of the power receiver's load can be reduced or even eliminated by the power receiver disconnecting the load during foreign object detection time intervals when the foreign object detection is performed. Although this may e.g. result in discontinuous power provisions, this may be overcome by an energy buffer, such as a large capacitor, providing power during typically short foreign object detection intervals.

As another example, e.g. the frequency or signal level of the test signal generated during the foreign object detection time interval may during the pre-power transfer phase be determined such that it at the receiver will correspond to a specific reference operating point/condition. The power receiver parameters/properties may be well known for this specific setting and accordingly these can be compensated for/considered in the foreign object detection test resulting in a more reliable and accurate test.

Yet another problem of existing methods is the difference between power transmitter designs and a reference power transmitter design for which the foreign object detection test has been designed or based on which the test parameters have been determined (e.g. via the technical specifications of the system). This may e.g. lead to differences in a measured quality factor at the power transmitter compared to the reference power transmitter. The power transmitter accordingly cannot directly use the information on an expected quality factor/reference Q factor received from the power receiver. Indeed, the power transmitter needs to translate the measured Q factor to the corresponding Q factor of the reference power transmitter, or translate the received reference quality factor to a new value that makes sense for its measured Q factor. Moreover, although the Q factor gives an indication of the power loss in a foreign object as seen from the power coil of the transmitter, it also depends on other aspects that are not directly related to the heating of a foreign object. However, by appropriately determining parameters for the measurement signal during the pre-power transfer phase adaptation, the measurement signal may be set for potentially compensating for such differences.

In the following, the system of FIG. 1 will be described in more detail. In the example, the electromagnetic power transfer signal and the electromagnetic test signal used for the foreign object detection are generated by two different coils (driven by different drivers). Further, the signals will be referred to by different terms, namely the electromagnetic signal generated during power transfer time intervals will be referred to as the power transfer signal and the electromagnetic signal generated during foreign object detection time intervals will be referred to as the electromagnetic test signal, orjust the test signal. However, it will be appreciated that in many embodiments, the electromagnetic signal may be generated from the same coil in both the power transfer time interval and the foreign object detection time interval, and indeed the same driver etc. may be used for both the power transfer time interval and the foreign object detection time interval. Indeed, the references to the test signals may in many embodiments be considered equivalent to the power transfer signal during the foreign object detection time interval.

Figure 2:
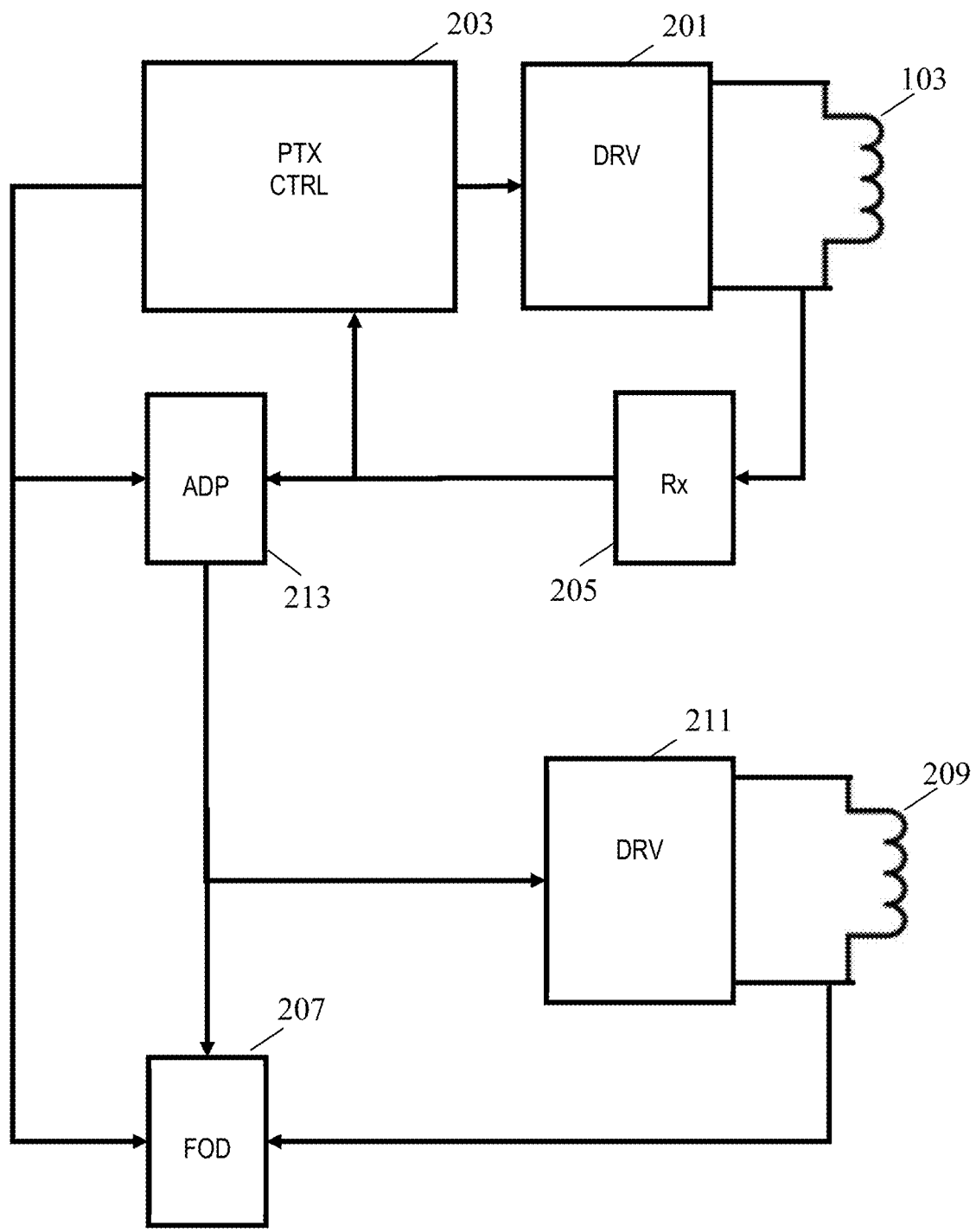
FIG. 2 illustrates an example of elements of a power transmitter in accordance with some embodiments of the invention.
Figure 3:
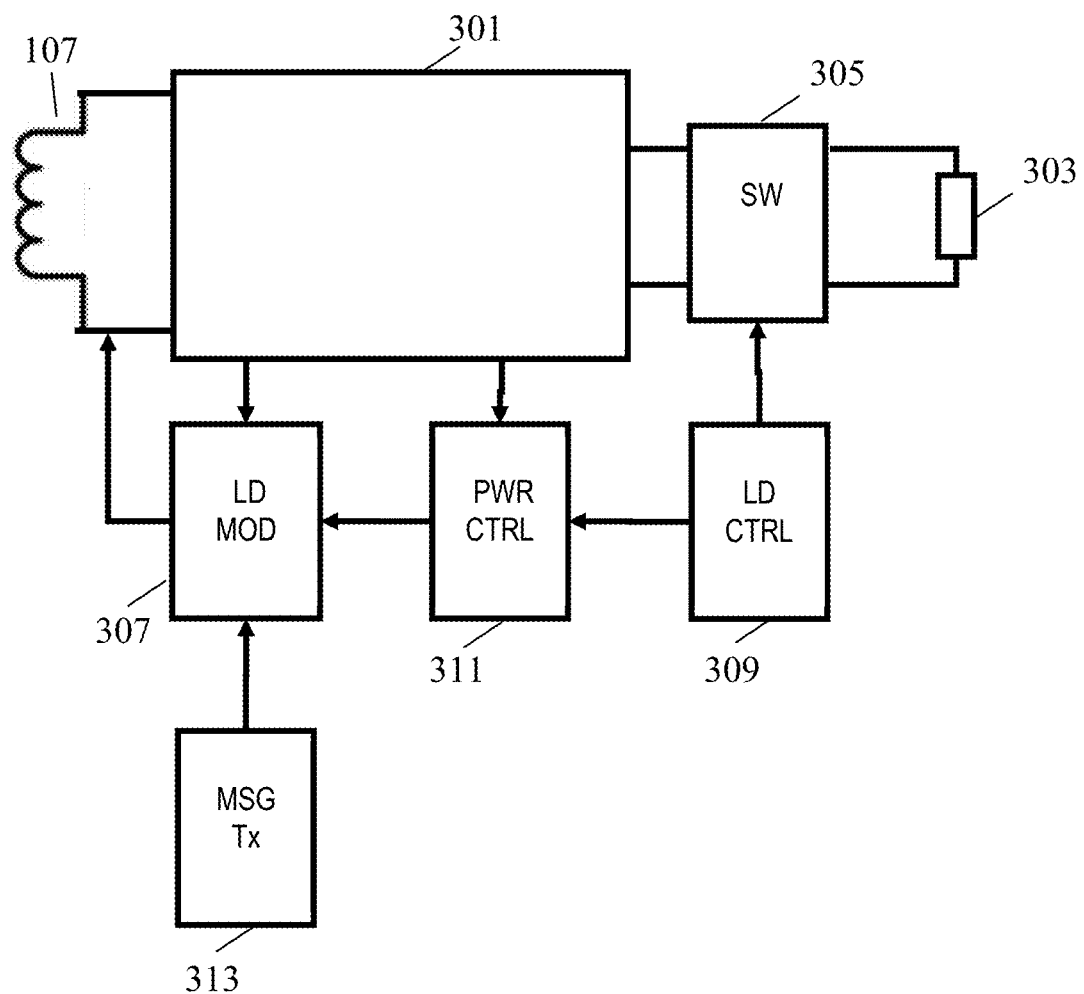
FIG. 3 illustrates an example of elements of a power receiver in accordance with some embodiments of the invention.

FIG. 2 illustrates elements of the power transmitter 101 and FIG. 3 illustrates elements of the power receiver 105 of FIG. 1 in more detail.

The power transmitter 101 includes a driver 201 which can generate a drive signal that is fed to the transmitter coil 103 which in return generates the electromagnetic power transfer signal, which can provide a power transfer to the power receiver 105. The power transfer signal is provided during power transfer time intervals of the power transfer phase.

The driver 201 may typically comprise an output circuit in the form of an inverter, typically formed by driving a full or half bridge as will be well known to the skilled person.

The power transmitter 101 further comprises a power transmitter controller 203 which is arranged to control the operation of the power transmitter 101 in accordance with the desired operating principles. Specifically, the power transmitter 101 may include many of the functionalities required to perform power control in accordance with the Qi Specifications.

The power transmitter controller 203 is in particular arranged to control the generation of the drive signal by the driver 201, and it can specifically control the power level of the drive signal, and accordingly the level of the generated power transfer signal. The power transmitter controller 203 comprises a power loop controller controlling a power level of the power transfer signal in response to the power control messages received from the power receiver 105 during the power control phase.

In order to receive data and messages from the power receiver 105, the power transmitter 101 comprises a message receiver 205 which is arranged to receive data and messages from the power receiver 105 (as will be appreciated by the skilled person, a data message may provide one or more bits of information). In the example, the power receiver 105 is arranged to load modulate the power transfer signal generated by the transmitter coil 103, and the message receiver 205 is arranged to sense variations in the voltage and/or current of the transmitter coil 103 and to demodulate the load modulation based on these. The skilled person will be aware of the principles of load modulation, as e.g. used in Qi wireless power transfer systems, and therefore these will not be described in further detail.

In some embodiments, communication may be performed using a separate communication channel which may be achieved using a separate communication coil, or indeed using the transmitter coil 103. For example, in some embodiments Near Field Communication may be implemented or a high frequency carrier (e.g. with a carrier frequency of 13.56 MHz) may be overlaid on the power transfer signal.

The power transmitter 101 further comprises a foreign object detector 207 which is arranged to perform foreign object detection tests, i.e. to specifically detect whether any undesired conductive elements are likely to be present within the generated electromagnetic field.

In the system, the foreign object detection tests are based on measurements performed during foreign object detection time intervals. During these foreign object detection time intervals, the transmitter controller 203 is arranged to reduce the power level of the power transfer signal, and specifically it may in the example of using different coils for generating the power transfer signal and the electromagnetic test signal switch the power transfer signal off completely.

During an interval in which foreign object detection is performed, i.e. during a foreign object detection time interval, the foreign object detector 207 may evaluate conditions to determine whether a foreign object is considered present or not. During the foreign object detection time interval, the power transmitter 101 generates an electromagnetic test signal and the foreign object detection is based on evaluating characteristics and properties of this signal.

For example, the power level of (the power extracted from) the generated test signal may be used as an indication of the power being extracted by potential foreign objects (typically by comparing it to the expected power extraction from the power receiver 105). The power level of the electromagnetic test signal reflects the power that is extracted from the electromagnetic test signal by conductive elements (including the receiver coil 107) in the electromagnetic field. It thus indicates the power extracted by the combination of the power receiver 105 as well as any foreign objects that may be present. The difference between the power level of the electromagnetic signal and the power extracted by the power receiver 105 accordingly reflects the power extracted by any foreign objects present. The foreign object detection may for example be a low complexity detection wherein a detection of a foreign object is considered to have occurred if the difference between the power level of the electromagnetic signal (henceforth referred to as transmit power level) exceeds the reported power extracted by the power receiver 105 (henceforth referred to as received power level).

In the approach, the foreign object detection is accordingly based on a power level comparison between a transmitted power level and a reported received power level. The reaction to a detection of a foreign object may be different in different embodiments. However, in many embodiments, the power transmitter 101 may be arranged to terminate a power transfer (at least temporarily) in response to a detection of a foreign object.

In order to generate the test signal, the power transmitter 101 comprises a test coil 209 which is coupled to a test generator 211. The test generator 211 is arranged to generate a test drive signal for the test coil 209 to provide the electromagnetic test signal during the foreign object detection time interval. The test drive signal is an electrical signal fed to the test coil 209 resulting in the electromagnetic test signal being generated, i.e. the test coil 209 generates a corresponding electromagnetic field with a field strength depending on the test drive signal.

The test generator 211 may be comprise substantially the same functionality as the driver 201, e.g. the output of the test generator 211 may be a half or full bridge inverter. Indeed, as previously mentioned, in many embodiments, the test generator 211 may be implemented by the driver 201 and the test coil 209 may be implemented by the transmitter coil 103. Accordingly, in the following, all references to test generator 211 and the test coil 209 may as appropriate be considered as references to the driver 201 and the test coil 209 for embodiments where the same coil is used for the generation of both the power transfer signal and the electromagnetic test signal. In such a situation, the power of the generated electromagnetic signal may be adapted to typically a fixed reference level during the foreign object detection time interval relative to the power transfer time interval.

The power transmitter further comprises an adapter which is arranged to, prior to the power transmitter 101 entering the power transfer phase, determine a suitable value for one or more parameters of the test drive signal. These values are then applied during (at least one) foreign object detection time intervals of the power transfer phase. The adapter 213 will be described in more detail later.

FIG. 3 illustrates some exemplary elements of the power receiver 105.

The receiver coil 107 is coupled to a power receiver controller 301 which couples the receiver coil 107 to a load 303 via a switch 305 (i.e. it is a switchable load 305). The power receiver controller 301 includes a power control path which converts the power extracted by the receiver coil 107 into a suitable supply for the load. In addition, the power receiver controller 301 may include various power receiver controller functionality required to perform power transfer, and in particular functions required to perform power transfer in accordance with the Qi specifications.

In order to support communication from the power receiver 105 to the power transmitter 101 the power receiver 105 comprises a load modulator 307. The load modulator 307 is arranged to vary the loading of the receiver coil 107 in response to data to be transmitted to the power transmitter 101. The load variations are then detected and demodulated by the power transmitter 101 as will be known to the person skilled in the art.

Figure 4:
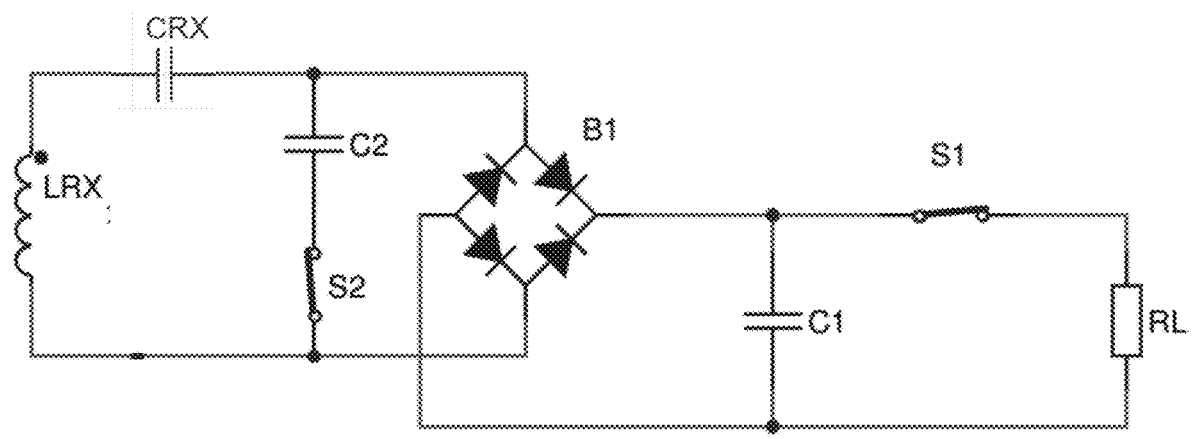
FIG. 4 illustrates an example of elements of a power receiver in accordance with some embodiments of the invention.

FIG. 4 illustrates a circuit diagram of elements of an example of a power path of the power receiver 105. In the example, the power receiver 105 comprises the receiver coil 107 referred to by the designation LRX. In the example, receiver coil 107 is part of a resonance circuit and the power receiver 105 accordingly also includes a resonance capacitor CRX. The receiver coil 107 is subjected to the electromagnetic signal and accordingly an AC voltage/current is induced in the coil. The resonance circuit is coupled to a rectifier bridge with a smoothing capacitor C1 coupled to the output of the bridge. Thus, a DC voltage is generated over the capacitor C1. The magnitude of the ripple on the DC voltage will depend on the size of the smoothing capacitor as well as on the load.

The bridge B1 and smoothing capacitor C1 are coupled to the load 303 which is indicated by reference sign RL via the switch 305 which is illustrated by switch S1. The switch 305 can accordingly be used to connect or disconnect the load from the power path and thus the load is a switchable load 305. It will be appreciated that whereas the switch S1 is shown as a conventional switch, it may of course be implemented by any suitable means including typically by a MOSFET. It will also be appreciated that the load 303 is illustrated as a simple passive port but that it may of course be any suitable load. For example, the load 303 may be a battery to be charged, a mobile phone, or another communication or computational device, may be a simple passive load etc. Indeed, the load 303 need not be an external or dedicated internal load but may for example include elements of the power receiver 105 itself. Thus, the load 303 illustrated in FIGS. 3 and 4 may be considered to represent any load of the receiver coil 107/the electromagnetic signal that can be disconnected by the switch 305/S1, and it is accordingly also referred to as a switchable load 305.

FIG. 4 further illustrates a load modulation capacitor C2 which can be connected or disconnected in parallel to the resonance circuit based on the switching of switch S2. The load modulator 307 may be arranged to control the switch S2 such that the load of the modulation capacitor C2 can be connected and disconnected in response to data to be transmitted to the power transmitter 101 thereby providing load modulation.

The power receiver 105 is arranged to enter a foreign object detection mode during the foreign object detection time interval of each time frame during the power transfer phase. In the example, the power receiver 105 comprises a load controller 309 which controls the switch 305 (equivalently the switch 305 can be considered part of the load controller). During a foreign object detection time interval, the load controller 309 can disconnect the load 303 from the power receiver, i.e. it disconnects a load of the power receiver controller 301, and thus a load of the receiver coil 107. Thus, in this way the load controller 309 may reduce the loading of the receiver coil 107 during the foreign object detection interval. Furthermore, not only is the load of the power receiver 105 reduced thereby making it easier to detect other power loss but often more importantly the power receiver 105 enters a more well-defined or certain state in which the impact of load variations on the electromagnetic test signal is reduced.

It will be appreciated that the loading of the receiver coil 107 may not be completely switched off during the foreign object detection interval. For example, the power receiver 105 may still extract power for e.g. operating some internal circuitry. Thus, the load controller 309 may be arranged to disconnect a load from loading the receiver coil 107 while still allowing the receiver coil 107 to be loaded by one or more other loads. Indeed, the loading of the receiver coil 107 can be considered as being comprised of a load which is disconnected by the load controller 309 during the foreign object detection interval and a load which is not disconnected by the load controller 309. Thus, the load 303 can be considered to represent the load that is disconnected by the receiver coil 107 during the foreign object detection interval. This load may include both an external or internal load for which the power transfer is established but may also include for example internal control functionality temporarily switched off during the foreign object detection interval.

In some embodiments. the switchable load may e.g. be disconnected by a reduction of the induced voltage at the input of the rectifier B1 while at the same time maintaining a high voltage level at the output of the rectifier by means of stored energy at the switchable load (which could be a battery), and/or at the capacitor C1. This may stop the current through the rectifier B1 and therefore may effectively disconnect the switchable load.

The power receiver 105 includes a power controller 311 which is arranged to establish a power control loop with the power transmitter 101. Specifically, the power controller 311 can transmit power control messages to the power transmitter 101 and in response the power transmitter 101 may change the power level of the power transfer signal during the power transfer time intervals. Typically, the power controller 311 may generate power control error messages which indicate a request for the power transmitter 101 to increase or decrease the power level. The power controller 311 may determine the appropriate error messages by comparing a measured value to a reference value. During power transfer, the power controller 311 may compare the provided power level with the required power level and request an increased or decreased power level based on this comparison.

Figure 5:
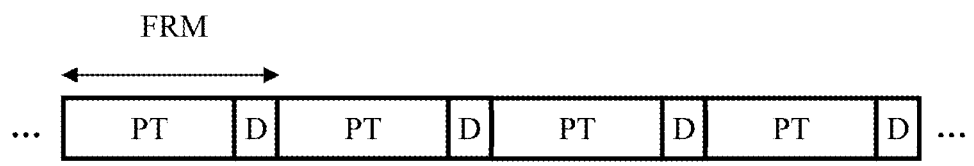
FIG. 5 illustrates an example of a time frame for a wireless power transfer system of FIG. 1.

As previously mentioned, the system applies a repeating time frame during the power transfer phase where the time frame comprises at least one power transfer time interval and on foreign object detection time interval. An example of such a repeating time frame is illustrated in FIG. 5 where power transfer time intervals are indicated by PT and foreign object detection time intervals are indicated by D. In the example, each time frame FRM comprises only one foreign object detection time interval and one power transfer time interval and these (as well as the time frame itself) have the same duration in each frame. However, it will be appreciated that in other embodiments, other time intervals may also be included in a time frame (such as e.g. communication intervals) or a plurality of foreign object detection time intervals and/or power transfer time intervals may be included in each time frame. Furthermore, the duration of the different time intervals (and indeed the time frame itself) may in some embodiments vary dynamically.

In the approach, the foreign object detection and the power transfer is thus separated in the time domain thereby resulting in reduced cross-interference from the power transfer to the foreign object detection. Thus, the variability and uncertainty resulting from variations in the operating conditions for the power transfer can be isolated from the foreign object detection resulting in a more reliable and accurate foreign object detection.

In the power transfer signal time interval, the power transmitter is thus arranged to perform power transfer during the power transfer time interval of the time frames of the power transfer phase. Specifically, during these time intervals, the power transmitter 101 and the power receiver 105 may operate a power control loop (the power control loop may be based on communication within the power transfer signal time interval or may e.g. be based on communication outside of the power transfer signal time interval, such as in dedicated communication time intervals. For example, each foreign object time interval may be separated by a plurality of alternating power transfer signal time intervals and communication time intervals). Thus, the level of the power being transferred may be dynamically varied. In the foreign object detection time intervals of the time frames of the power transfer phase, at least one parameter of the drive signal, and thus of the electromagnetic test signal, is set to a value determined during an adaptation operation performed prior to the power transfer phase. Thus, in the foreign object detection time interval, the parameter may be set to a predetermined value (i.e. being determined prior to the power transfer phase). In contrast, the parameter may not be constrained to this predetermined value during power transfer time intervals.

For example, during a power transfer time interval, the system may operate a power control loop which allows the power level of the power transfer signal to be varied in response to power control messages from the power receiver. The power control loop may control/vary at least one of a current, voltage, and frequency of the drive signal/power transfer signal. In contrast, during a foreign object detection time interval, the parameter varied by the power control loop during the power transfer time interval may be set to a predetermined value determined prior to the power transfer phase.

In many embodiments where the same coil is used for both the power transfer signal and the electromagnetic test signal, the power transmitter may be arranged to reduce the level of the power transfer signal during the foreign object detection time interval relative to the power transfer time interval. In many situations, the power level of the power transfer signal may be allowed to increase to high levels, such as e.g. to levels of 10-100 W, or even substantially higher in many applications (e.g. for power transfer to kitchen appliances). However, during a foreign object detection time interval, the power level of the generated electromagnetic signal may be reduced to a predetermined level that is much lower than the current or maximum allowable power during the power transfer time interval. For example, the power level may be set to a predetermined level not exceeding 1 W. In other words, the power of the electromagnetic test signal during the foreign object detection time interval may be constrained to a power level that is substantially (e.g. by a factor of no less than 2, 5, or 10) lower than a maximum allowed power level of the power transfer signal during the power transfer time interval.

Further, the power receiver 105 is arranged to reduce the load of the generated electromagnetic signal/field during the foreign object detection time interval relative to during the power transfer time interval, i.e. the power receiver 105 is arranged to decrease the loading of the power receiver 105 of the electromagnetic test signal during the foreign object detection time interval relative to the loading of the power transfer signal during the power transfer time interval. Specifically, in the example of FIG. 3 the power receiver 105 is arranged to disconnect the switchable load during the foreign object detection time interval and to connect it during the power transfer time interval. Thus, during the foreign object detection time interval, the power receiver 105 may switch off (typically) the main load and indeed in many embodiments only a minimal load required for the continued operation of the power receiver 105 may be maintained.

In the example of FIG. 4, the switch S1 may be used to disconnect the load during the foreign object detection time interval. It will be appreciated that in embodiments where the switchable load 303 requires a more constant power provision, the switch S1 may be positioned before the capacitor C1 or another energy reservoir may be provided after switch S1 to supply the switchable load 303 with power during the foreign object detection time interval (or e.g. the previously described approach of reducing the induced voltage at the input of the rectifier B1 while at the same time maintaining a high voltage level at the output of the rectifier B1 by means of stored energy at the switchable load (e.g. a battery), and/or at the capacitor C1 may be used).

The power receiver 105 may accordingly reduce a load of the power receiver during the foreign object detection time interval. Specifically, the load of the electromagnetic test signal by the power receiver during the foreign object detection time interval will be less than the load of the power transfer signal by the power receiver during the power transfer time interval (the load may e.g. be considered the effective resistive impedance of respectively the transmitter coil 103 and the test coil 209 during the power transfer time interval and the foreign object detection time interval respectively). Typically, the power transfer signal and the electromagnetic test signal will have corresponding properties and thus both induce a signal in the receive coil 107. Therefore, disconnecting the switchable load 303 during the foreign object detection time interval will reduce the load of the electromagnetic test signal relative to the load that is experienced by the power transfer signal (and thus would be experienced by an electromagnetic test signal) generated during the power transfer time interval when the load is connected.

The disconnection of the switchable load 303 not only reduces the load of the electromagnetic test signal but may also provide for this load to be more predictable and to have reduced variation. Typically, the load of a power transmitter by a power receiver may vary substantially not only from application to application, but also as a function of time for the same application and power transfer session. The power control loop is operated during the power transfer phase to adapt to such variations. However, by introducing a foreign object detection time interval in which the load may be disconnected (or otherwise set to e.g. a predetermined level), it is possible to enter the power receiver into a reference mode in which the loading of the electromagnetic field is more predictable. Thus, the foreign object detection tests can be performed based on the assumption that the power receiver is in this reference or test mode, and thus e.g. a predetermined loading of the electromagnetic test signal can be assumed. The approach may thus not only allow for the loading by the power receiver 105 to be reduced (thereby improving accuracy by the relative impact of any foreign objects being higher) but also allows this to be more predictable thereby facilitating the compensation for the presence of the power receiver during the foreign object detection test.

In addition to applying the time frame comprising specific foreign object detection time intervals, the system also applies an approach wherein the value of one or more parameters (or properties) of the generated electromagnetic test signal is adapted based on a pre-power transfer phase adaptation process. This adaptation process thus determines a preferred value for one or more of the parameters/properties of the electromagnetic test signal prior to the power transfer phase and then applies this preferred value during the foreign object detection time intervals of the subsequent power transfer phase. Further, the determination of the parameter is based on information transmitted from the power receiver 105 to the power transmitter 101.

Thus, during an adaptation interval prior to the power transfer phase, the power transmitter 101 enters a foreign object detection initialization mode in which a preferred value for a parameter of the electromagnetic test signal is determined based on one or more messages from the power receiver 105.

Similarly, the power receiver controller 301 is arranged to control the power receiver 101 to, during the adaptation interval prior to the power transfer phase, operate in a foreign object detection initialization mode in which the power receiver 101 transmits at least one message to the power transmitter 101.

Figure 6:
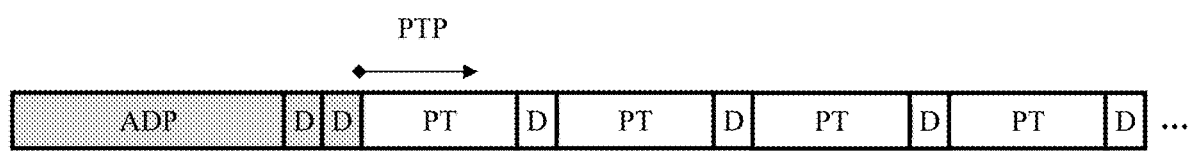
FIG. 6 illustrates an example of a time frame for a wireless power transfer system of FIG. 1.

This is illustrated in FIG. 6 which in addition to the power transfer phase (PTP) also illustrates the adaptation time interval ADP in which the power transmitter 101 and power receiver 105 may enter a foreign object detection initialization mode to determine a preferred value for one or more parameters of the electromagnetic test signal to be applied during one or more, and typically all, foreign object detection time intervals of the subsequent power transfer phase.

The approach may further allow the foreign object detection tests of the subsequent foreign object detection time intervals of the power transfer phase to be performed under more predictable and controlled conditions with reduced variability and uncertainty. For example, the parameter of the electromagnetic test signal may be set to a value that corresponds to a reference condition for which a property of the power receiver 101 is known. E.g., the loading by the power receiver 105 on an electromagnetic test signal resulting in a given induced signal level at the power receiver 105 may be determined during design/manufacturing and stored in the power receiver 105. During use, the power receiver 105 may, when operating in the foreign object detection initialization mode, transmit one or more messages to the power transmitter 101 which provides information on the setting of the drive signal to achieve this induced signal level as well as the corresponding loading by the power receiver 105. During the foreign object detection time intervals of the power transfer phase, the power transmitter 101 may then set the drive signal parameter (e.g. the signal level) to the appropriate value, and the foreign object detector 207 may e.g. perform a power loss analysis foreign object detection test which includes a compensation for the known/estimated power loss by the power receiver 105.

Thus, the system of FIGS. 1-4 provides for a much improved foreign object detection test approach where the foreign object detection tests are performed under much more controlled conditions thereby allowing more accurate and reliable foreign object detection tests to be performed.

The parameter being set based on the foreign object detection initialization mode operation may depend on the preferences and requirements of the individual embodiment and application scenario. Typically, the power transmitter 101 may be able to determine a preferred value for at least one of a voltage, current, and frequency of the test drive signal, and thus of the electromagnetic test signal.

For example, in some embodiments, the message received from the power receiver 105 may indicate a required magnetic field strength at a given distance from the transmitter coil 103 (for example, the power receiver 105 may indicate a required magnetic field strength at a distance corresponding to the expected distance from the test coil 201 (which may be assumed to be collocated with the transmitter coil 103) to the receive coil 107 when the power receiver 105 is optimally positioned on the power transmitter 101). The power transmitter 101 may convert this required magnetic field strength into a required test drive signal current that will give rise to a field strength corresponding to that required. The power receiver 105 may further provide an indication of the power loss in the power receiver 105 for this field strength (specifically the power loss from friendly metal and internal circuitry and with the switchable load 303 disconnected).

The power transmitter 101 may then proceed to set the current of the test drive signal to this value during the foreign object detection time intervals of the subsequent power transfer phase and when performing power loss based foreign object detection tests, it may determine the power loss as the power of the test drive signal minus the power loss expected from the power receiver 101.

In many embodiments, the message received from the power receiver 105 may comprise an indication of a property of the power receiver 105, and the adapter 213 may be arranged to determine the preferred value for the given parameter of the test drive signal/electromagnetic test signal in response to the indication of the property of the power receiver 105.

For example, as indicated above, the message may indicate a power loss in friendly metal and the loading by the power receiver circuitry for a given reference operating condition. As another example, the message indication may simply indicate a type or class of power receiver and the adapter 213 may be arranged to e.g. retrieve corresponding predetermined parameter values for the electromagnetic test signal from a local store that comprises suitable values for a range of types/classes of power receivers.

In some embodiments, the indication may be an indication of e.g. a resonance frequency (or frequency range) for the power receiver 105. This may for example be used by the power transmitter 101 to set the frequency of the test drive signal/electromagnetic test signal to the indicated frequency, and indeed may in some embodiments allow the power transmitter 101 to adjust a resonance frequency of an output resonance circuit involving the test coil 209. Such a scenario may be particularly suitable for foreign object detection tests that are based on measuring the Q factor (or other quality measure) of the output resonance circuit.

In some embodiments, the message received from the power receiver 105 may comprise an indication of an expected impact of the power receiver on a reference test drive signal, and the adapter 213 may be arranged to determine the preferred value and/or to adapt the foreign object detection test in response to the indication of the expected impact of the power receiver.

For example, as previously described, the power receiver 105 may indicate a preferred setting for e.g. the strength of the electromagnetic test signal and consequently a preferred setting for the current through the test coil 209. The power transmitter 101 may then provide a reference test drive signal corresponding to this reference electromagnetic test signal.

Alternatively or additionally, the power receiver 105 may indicate e.g. the power loss in the power receiver 105 during a foreign object detection time interval (i.e. with the switchable load 303 being disconnected) when a reference electromagnetic test signal is provided. It may then as previously described adapt the foreign object detection test, e.g. by subtracting the reported power loss in the power receiver 105 from the measured power level for the test drive signal.

As another example, the power receiver 105 may provide an indication of a quality of a power receiver resonance circuit comprising the receive coil 107. For example, an indication of a resistive load or Q factor may be provided. The adapter 213 may then adapt e.g. a foreign object detection test based on measuring the Q factor of the power transmitter output resonance circuit comprising the test coil 209 based on the reported power receiver Q factor. For example, a lower reported Q factor can reduce the threshold for detecting whether a reduced quality measure for the output resonance circuit may be indicative of a foreign object being present.

Thus, in some embodiments, the power receiver 105 may transmit data that may be indicative of the impact of the power receiver 105 on the electromagnetic test signal when the power transmitter 101 provides an expected reference electromagnetic test signal, i.e. when the electromagnetic test signal has the expected reference properties.

The power transmitter 101 may use this to determine the expected values for parameters of the test drive signal/electromagnetic test signal, and thus may adapt the foreign object detection test, and specifically the decision criteria for foreign object detection, accordingly.

The information provided by the power receiver 105 may in many embodiments provide or allow a determination of one or more of the following:
- an expected power dissipation by power receiver (typically including friendly metal),
- an expected (minimum) Q factor, and/or
- an expected maximum resonance frequency.

The adapter 213 may then adapt the test drive signal and/or the foreign object detection test in response.

In some embodiments, the message from the power receiver may comprise an indication of a difference between a current power receiver operating value and a test reference power receiver operating value. For example, the message may comprise an indication of a difference between a current level of the signal induced in the receive coil 107 and the reference/desired level of the signal induced in the receive coil 107. The power transmitter 101 may be arranged to modify a parameter of the power transfer signal in response to the indication, and specifically may be able to drive the value towards a level where the message from the power receiver indicates that the current operating value is equal to the desired operating value.

As an example, during the pre-power transfer phase adaptation phase where the power transmitter 101 and the power receiver 105 are both operating in the foreign object detection initialization mode, the power receiver 105 may measure e.g. the current amplitude of the voltage over the rectifier bridge B1. It may compare this to a desired level and send a message to the power transmitter 101 which indicates the difference. For example, if the measured voltage is only half the desired level, it may transmit a request for the signal level of the electromagnetic test signal to be increased by 6 dB. The power transmitter 101 may in response to receiving the message set the preferred value for the level of the test drive signal to be 6 dB higher than the current value. This preferred value may then be used for generating the electromagnetic test signal during the foreign object detection time intervals of the power transfer phase.

As another example, the induced voltage at the power receiver may be measured using a dedicated coil. This may provide a direct indication of the field to which the friendly metal is exposed. The measurement result may be transmitted to the power transmitter 101 which may then adapt the test drive signal in response.

In some embodiments, the process of the power receiver 105 transmitting messages indicating the difference between a current operating value and a reference value may be iterated and specifically the power receiver 105 and power transmitter 101 may during the adaptation interval implement a control loop that drives the test drive signal towards the desired level for the power receiver 105 to be operating at the desired reference operating point, e.g. typically at the desired level of signal induced in the receive coil 107. The power receiver 105 may simply repeatedly transmit indications for an increase or decrease in the level of the electromagnetic test signal. The resulting value for the power transfer signal may then be stored as the preferred value and this may be applied during the foreign object time intervals of the power transfer phase.

In more detail, during the adaptation interval, the power receiver controller 301 may arranged to determine a difference between a level of a signal induced in the power receiver coil and a reference level. The level may typically be determined as a voltage level (specifically a level of an induced voltage) but could in other embodiments e.g., be a power level (specifically a level of an induced signal power) or a current level (specifically a level of an induced current). It will be appreciated that any suitable indication of a level of an induced signal may be used.

In many embodiments, the power receiver controller 301 is arranged to compare a voltage level indication of an induced signal to a reference voltage, and to generate test signal control messages based on this comparison. If the voltage is below the reference value, a test signal control message requesting the level of the electromagnetic test signal to be increased is transmitted, and if it is above the reference value, a test signal control message requesting the level of the electromagnetic test signal to be decreased is transmitted. In response, the adapter 213 increases or decreases the test drive signal level to provide a corresponding change in the electromagnetic test signal. Specifically, rather than merely transmitting a single message, the power receiver 105 and the power transmitter 101 may effectively implement a control loop during the adaptation interval which drives the test drive signal to generate the desired reference operation condition for the foreign object test. The preferred value of the parameter of the test drive signal may be set to the end value after the loop has converged to a given value corresponding to the reference condition.

In this way, the power receiver 105 can control the level of the electromagnetic test signal such that the level of the induced signal is driven towards the reference value. Specifically, the voltage over the receiver coil 107 may be driven to be equal to a given reference voltage.

The approach thus allows for the power receiver 105 to be in control of establishing a predetermined configuration in which a typically predetermined load is provided and the induced signal, and specifically the induced voltage, is at a predetermined level. Thus, a reference operation condition is set up for the power receiver 105 (by the power receiver 105 itself).

In some such systems, the message(s) transmitted to the power transmitter 101 may comprise an indication of a loading of the power transmitter 101 by the power receiver 105 when the power receiver 105 is operating at the given reference operating point for the foreign object detection, i.e. when the switchable load 303 is disconnected and the induced signal level is at/equal to the reference level. Specifically, the indication may be indicative of the power that would be extracted from the electromagnetic test signal when the system is operating in a scenario and operating configuration with the switchable load 303 being disconnected and the induced signal in the power receiver coil being at the reference level.

This loading indication accordingly provides information on the effect that the power receiver 105 has on the electromagnetic test signal during the foreign object detection time interval. During this interval, the power transmitter 101 sets the value of the test drive signal such that the resulting level of the induced signal is substantially at the reference value (when no foreign object is present and with the switchable load 303 being disconnected).

The loading indication may typically be a predetermined loading indication. It may be based on assumptions that the induced signal level is at the reference level and that the switchable load 303 is disconnected. In many embodiments, the predetermined loading indication may indeed be a stored value which is transmitted to the power transmitter 101 simply by being retrieved from memory and transmitted without being modified by any measurement or modification based on current conditions. Indeed, in many embodiments, the only measurement made is that of the induced signal level such that this can be driven towards the reference level. However, in many embodiments, the predetermined loading indication is also independent of this, i.e. the predetermined loading indication is retrieved and transmitted to the power transmitter 101, and the measurements of the induced signal are then used to drive the level to the reference level such that the actual operating condition is equal to that assumed for the predetermined loading indication.

For example, during the design or manufacturing phase for a power receiver, this may be positioned in a test set-up wherein an electromagnetic signal is provided and wherein it is assured that no other objects are present to extract power from the electromagnetic detection signal. The power receiver may be set to a configuration corresponding to the switchable load 303 being disconnected (for example no load may be included or a switch of the power receiver may disconnect the load). The power receiver may then be operated in a foreign object detection mode with the test setup generating an electromagnetic test signal at the appropriate reference levels. When a sufficiently stable operation is achieved, the power extracted from the electromagnetic test signal is measured (e.g. by measuring the power of a drive signal driving a coil generating the electromagnetic signal). The measurement can be performed under closely controlled conditions, and with highly accurate measurement devices and thus the extracted power can be very accurately measured. The measured value may then be programmed into the manufactured power receivers and used as the predetermined loading indication.

The predetermined loading indication may thus be a predetermined value which is transmitted to the power transmitter and which provides an indication of the loading that the power receiver is expected to exercise on the electromagnetic test signal when the power receiver 105 is operating in the foreign object detection operating configuration. The value is not merely a measurement of the actual power of the signal induced in the receiver coil 107 but is a predetermined value that may include e.g. loading caused by conductive elements of the power receiver 105 itself (often referred to as friendly metal). Thus, the message transmitter 313 in such embodiments transmits a predetermined loading indication that indicates the expected loading of the electromagnetic detection signal by the presence of the power receiver 105 operating in the foreign object detection configuration.

The message receiver 205 of the power transmitter 101 may receive the predetermined loading indication and forward this to the foreign object detector 207. The foreign object detector 207 may perform a foreign object detection test by comparing the power level of the generated electromagnetic test signal, i.e. the transmit power level, to the predetermined loading indication. In many embodiments, the foreign object detector 207 may simply subtract the predetermined loading indication from the transmitter power level. If the result exceeds a given threshold, the foreign object detector 207 may determine that a foreign object has been detected, and otherwise it is considered that no foreign object has been detected.

Specifically, the power transmitter may determine its transmitted power level during the foreign object detection timing interval for which a received power is reported from the power receiver 105 by the predetermined loading indication. Based on these values, the foreign object detector 207 can calculate the difference between the transmitted and received power and check if the difference is within a small tolerance range. If the difference is outside the range, the foreign object detector 207 indicates that a foreign object has been detected. If it is within the range, the foreign object detector 207 indicates that no detection of a foreign object has occurred. This range may be chosen such that the power dissipation in a metal object not detected by this power difference is considered acceptably low.

Of course, it will be appreciated that other, and typically more complex, decision criteria may be used in other embodiments.

As another example, the power transmitter 101 and power receiver 105 may perform an operation which adapts the frequency of the test drive signal in response to the messages from the power receiver 105. For example, the power transmitter 101 could sequentially set the frequency to a range of values and the power receiver 105 could transmit an indication of which setting resulted in the highest received value (corresponding to the most energy efficient transfer and optimally to the drive signal frequency and the frequencies of the resonance circuits of the power transmitter 101 and the power receiver 105 being equal). This frequency may then be used for the subsequent foreign object detection tests during the power transfer phase, In some embodiments, the adapter 213 may further be arranged to determine the preferred value in response to constraint of the foreign object detection test of the foreign object detector. In many embodiments, the constraint may be at least one of a constraint on a frequency of the test drive signal and a constraint of a minimum signal level for the test drive signal.

For example, in many embodiments, it is desirable for the test drive signal and the electromagnetic test signal to be as weak as possible as it will reduce any heat induced in potential foreign objects, will reduce power consumption, reduces the design requirements for e.g. the test coil 209 etc. However, at the same time the foreign object detection tends to be more accurate the higher the signal level/field strength is. Accordingly, in some embodiments, the adapter 213 may determine the preferred value for the signal level of the test drive signal but with that level being subject to a constraint of a minimum signal level. Thus, regardless of the information received from the power receiver 105, the adapter 213 will not set the preferred signal level that is used for the test drive signal/electromagnetic test signal during the foreign object detection time intervals of the power transfer phase to be below this given threshold.

As another example, in embodiments wherein the test coil 209 is part of an output resonance circuit, the adapter 213 may be arranged to set the frequency of the test drive signal as requested by the power receiver but subject to the constraint that this frequency is within a given frequency range. This may specifically ensure that the test output resonance circuit comprising the test coil 209 is not driven too far from its optimal resonance frequency.

In some embodiments, the adapter 213 may further be arranged to prevent the power transmitter from entering the power transfer phase if the preferred value does not meet a criterion. For example, a preferred value may be determined based on the information received from the power receiver 105 and this process may lead to a value that is outside the expected range for the parameter. For example, a power receiver 105 may continuously request increased power of the electromagnetic test signal until this is at a very high level. This may be indicative of an anomalous situation occurring, e.g. caused by an error in the power transmitter 101, the power receiver 105, or the presence of a foreign object. Accordingly, the adapter 213 may consider the determined parameter to be outside an operating range and the power transmitter 101 may be prevented from entering the power transfer phase thereby preventing that high level power transfer is begun in an error situation. Thus, a more resilient and reliable power transfer initialization can be achieved.

In some embodiments, the foreign object detector 207 may be arranged to adapt a parameter of the foreign object detection test in response to a measured value of the drive signal when in the foreign object detection initialization mode.

For example, when the preferred value has been determined, a test drive signal may be generated with the parameter set to the preferred value. Specifically, a test drive signal may be generated with the level and frequency that will be used during the foreign object detection time intervals of the power transfer phase. A property of the drive test signal may be measured for this setting, such as e.g. a voltage or current that provides an indication of the total power extracted from the electromagnetic test signal. The measured value may be stored and used as a reference for subsequent measurements during the power transfer phase. Thus, the foreign object detection may be based on a comparison to a reference measurement made during the operation in the foreign object detection initialization mode, i.e. during the pre-power transfer phase adaptation interval. As a specific example, the foreign object detection test may consider a foreign object to be detected if the measured extracted power during a foreign object detection time interval of the power transfer phase exceeds the measured extracted power during the adaptation interval by a given threshold.

Such an approach may typically provide an improved adaptation to the local conditions and may establish a typically accurate basis for detecting changes occurring by a foreign object being brought into the presence of a power transmitter during a power transfer phase. It may allow a more accurate foreign object detection in many scenarios.

In many embodiments, the power transmitter 101 may further be arranged to perform foreign object detection tests prior to initializing the power transfer phase. For example, as illustrated in FIG. 6, the pre-power transfer phase may include one or more foreign object detection time intervals following the adaptation interval and prior to entering the power transfer phase.

The foreign object detection tests performed during these pre-power transfer phase foreign object detection time intervals may be performed using the parameter values for the test drive signal determined when in the foreign object detection initialization mode operation, i.e. in the adaptation interval. As such, the foreign object detection tests prior to entering the power transfer phase may be the same as those performed during the power transfer phase, i.e. the same parameters may be used both for the foreign object detection test and for the generated test drive signal/electromagnetic test signal.

In such approaches the foreign object detector 207 may thus also perform foreign object detection tests in one or more initial test intervals prior to the power transfer. Furthermore, the power transmitter may be arranged to enter the power transfer phase only if the foreign object detection tests performed in these initial test intervals indicate that no foreign object detection is present. Such an approach may reduce the risk of high level power transfer being started in scenarios wherein this may cause excessive heat in a foreign object. Furthermore, the tests can be performed with all the benefits of the foreign object detection tests performed during the power transfer phase (specifically with the system operating in a dedicated reference configuration).

It will be appreciated that the reaction of the power transmitter 101 to a foreign object detection test being positive, i.e. indicating that a foreign object is present, may be different in different embodiments. Indeed, in many embodiments, the power transmitter 101 may be arranged to terminate the power transfer if the foreign object detection test indicates that a foreign object may be present.

In some embodiments, the foreign object detection is arranged to re-enter the power transmitter into the foreign object detection initialization mode if the foreign object detection test indicates that a foreign object may be present. The power transmitter 101 may further transmit an indication to the power receiver 105 that it has entered this foreign object detection initialization mode, and in response the power receiver 105 may enter the foreign object detection initialization mode. Thus, in some embodiments, the system may effectively return to the adaptation interval/mode of operation in response to a positive foreign object detection test. This may result in the system repeating the process of entering a predetermined configuration and determining a preferred value for the parameter(s) of the test drive signal (and thus the electromagnetic test signal). Following this process, the power transmitter 101 may again perform a number of foreign object detection tests and if these indicate that no foreign object is present, it may proceed to re-enter the power transfer phase.

The approach may provide improved resilience and more robust operation in many embodiments. It may for example allow the system to automatically recover from situations where e.g. the positive foreign object detection test is not due to the presence of a foreign object but rather occurs due to an inaccurate foreign object detection test being based on inaccurate assumptions. For example, if the foreign object detection test occurs due to the generated electromagnetic test signal being too high and therefore the actual power loss in friendly metal of the power receiver being higher than expected, the approach may allow an automatic "re-calibration" of the test drive signal and the foreign object detection test. If this is successful (with no foreign object detection subsequently being detected), the system may restart the power transfer.

Such event can for example occur when the position of the power receiver relative to the test coil of the power transmitter has been changed. Such position change can cause the friendly metal of the power receiver to change the measured signal of the power transmitter, and thus affect the foreign object test. The described approach may cause the system to automatically re-calibrate to the changed conditions.

In some embodiments, the power transmitter 101 may be arranged to set a parameter of the power transfer/the power transfer signal in response to a measurement of the test drive signal during the foreign object detection time interval. Specifically, the adapter 213 may be arranged to set a maximum level for the power transfer signal during the power transfer interval in response to a measurement of the test drive signal during the foreign object detection interval.

For example, the power of the test drive signal may be determined based on measurements of the current and/or voltage of the test drive signal. This power level reflects the power that is being extracted from the electromagnetic test signal. This may be compared to the expected power to be extracted from the electromagnetic test signal by the power receiver 105. If the two values are very close, it can be assumed that there is only the power receiver 105 present and a high power level of the power transfer signal during the power transfer time interval will be allowed. However, if the difference is higher, but still not high enough to result in a positive foreign object detection, the measurement may still reflect a risk that some power is lost in another entity than the power receiver 105. The power transmitter 101 may in this case reduce the maximum power level of the power transfer signal such that the potential power loss outside the power receiver is ensured to be sufficiently low to not e.g. risk heating to excessive temperatures.

Thus, in some embodiments, the power transmitter 101 may use the measurements during the foreign object detection time interval to determine the maximum amplitude (and/or frequency) of the power transfer signal considered acceptable in that it is assumed that any resulting power loss outside the power receiver 105 will still result in potential temperature rises that are within acceptable limits. The power transmitter 101 may then limit the power transfer signal to this maximum value and e.g. generate an alarm or transmit a warning message to the power receiver 105 if this tries to increase the power level above this determined maximum level.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

It will be appreciated that the reference to a preferred value does not imply any limitation beyond it being the value determined in the foreign object detection initialization mode, i.e. it is preferred by virtue of it being determined in the adaptation process. The references to a preferred value could be substituted for references to e.g. a first value.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A power transmitter comprising:
a transmitter coil, wherein the transmitter coil generates a power transfer signal;
a driver circuit,
  wherein the driver circuit is arranged to generate a drive signal for the transmitter coil,
  wherein the driver circuit is arranged to generate the drive signal during a power transfer phase,
  wherein the drive signal uses a repeating time frame,
  wherein the repeating time frame comprises at least a power transfer time interval and a foreign object detection time interval;
a receiver circuit, wherein the receiver circuit is arranged to receive messages from a power receiver;
a test coil, wherein the test coil is arranged to generate an electromagnetic test signal;
a test generator, wherein the test generator is arranged to drive the test coil such that the electromagnetic test signal is provided during the foreign object detection time interval;

a foreign object detector, wherein the foreign object detector is arranged to perform a foreign object detection test in response to a measured parameter of the test drive signal;
an adapter circuit, wherein the adapter circuit is arranged to control the power transmitter to operate in a foreign object detection initialization mode prior to entering the power transfer phase.

2. The power transmitter of claim 1,
wherein the test generator is arranged to set a signal parameter of the test drive signal to a preferred value during the foreign object detection time interval,
wherein the adapter circuit is arranged to determine the preferred value in response to a constraint of the foreign object detection test of the foreign object detector.

3. The power transmitter of claim 2, wherein the constraint is at least one of a minimum signal level and a constraint on a frequency of the test drive signal.

4. The power transmitter of claim 2,
wherein the test generator is arranged to generate the test drive signal with the drive parameter of the test drive signal adapted to the preferred value in an initial test interval prior to the power transfer phase,
wherein the foreign object detector is arranged to perform the foreign object detection test in the initial test interval.

5. The power transmitter of claim 1,
wherein if the foreign object detection test in the foreign object detection time interval is indicative of a foreign object being present,
wherein the foreign object detector is arranged to re-enter the power transmitter into the foreign object detection initialization mode.

6. The power transmitter of claim 2, wherein the adapter circuit is arranged to prevent the power transmitter from entering the power transfer phase if the preferred value does not meet a criterion.

7. The power transmitter of claim 1, wherein the foreign object detector is arranged to adapt a parameter of the foreign object detection test in response to a measured value of the drive signal when in the foreign object detection initialization mode.

8. The power transmitter of claim 1, wherein the adapter circuit is arranged to set a maximum level for the power transfer signal during the power transfer interval in response to a measurement of the test drive signal during the foreign object detection interval.

9. A wireless power transfer system comprising:
a power transmitter, wherein the power transmitter is arranged to provide power to a power receiver, the power transmitter comprising:
a transmitter coil, wherein the transmitter coil is arranged to generate a power transfer signal;
a driver circuit,
wherein the driver circuit generates a drive signal for the transmitter coil,
wherein the driver circuit is being arranged to generate the drive signal during a power transfer phase,
wherein the drive signal uses a repeating time frame,
wherein the repeating time frame comprises at least a power transfer time interval and a foreign object detection time interval,
wherein a power of the power transfer signal is reduced relative to the power transfer time interval during the foreign object detection time interval;
a receiver circuit, wherein the receiver circuit is arranged to receive messages from the power receiver;
a test coil, wherein the test coil is arranged to generate an electromagnetic test signal;
a test generator, wherein the test generator is arranged to drive the test coil such that an such that the electromagnetic test signal during the foreign object detection time interval;
a foreign object detector, wherein the foreign object detector is arranged to perform a foreign object detection test in response to a measured parameter of the test drive signal;
an adapter circuit, wherein the adapter circuit is arranged to control the power transmitter to operate in a foreign object detection initialization mode prior to entering the power transfer phase,
and the power receiver, the power receiver comprising:
a power receiving coil, wherein the power receiving coil is arrange to extract power from the power transfer signal;
a foreign object detection controller circuit, wherein the foreign object detection controller circuit is arranged to reduce a load of the power receiver during the foreign object detection time interval;
a message transmitter, wherein the message transmitter is arranged to transmit the first message to the power transmitter.

10. The wireless power transfer system of claim 9,
wherein the power receiver further comprises a power receiver controller circuit, wherein the power receiver controller circuit is arranged to control the power receiver to operate in a foreign object detection initialization mode in which the power receiver transmits at least one message to the power transmitter,
wherein the at least one message instructs the power transmitter to bias the test drive signal towards causing a reference condition at the power receiver.

11. A method for a power transmitter wirelessly providing power to a power receiver, wherein the power transmitter comprises:
a transmitter coil, wherein the transmitter coil is arranged to generate a power transfer signal,
a test coil, wherein the test coil is arranged to generate an electromagnetic test signal; and
a receiver circuit, wherein the receiver circuit is arranged to receive from the power receiver,
the method comprising:
generating a drive signal for the transmitter coil,
wherein the drive signal uses a repeating time frame during a power transfer phase,
wherein the repeating time frame comprises at least a power transfer time interval and a foreign object detection time interval;
generating a test drive signal for the test coil so as to provide the electromagnetic test signal during the foreign object detection time interval; and
performing a foreign object detection test in response to a measured parameter of the test drive signal.

12. The method as claimed in claim 11, further comprising:
generating the test drive signal with a drive parameter of the test drive signal adapted to a preferred value in an initial test interval prior to the power transfer phase; and performing the foreign object detection test in the initial test interval.

\* \* \* \* \*